(12) United States Patent
Fung

(10) Patent No.: US 7,752,647 B2
(45) Date of Patent: Jul. 6, 2010

(54) VIDEO DATA PACKING

(75) Inventor: Hon Chung Fung, Flower Mound, TX (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 976 days.

(21) Appl. No.: 11/468,017

(22) Filed: Aug. 29, 2006

(65) Prior Publication Data

US 2008/0060042 A1 Mar. 6, 2008

Related U.S. Application Data

(60) Provisional application No. 60/807,641, filed on Jul. 18, 2006.

(51) Int. Cl.
*H04N 7/173* (2006.01)

(52) U.S. Cl. .............................. 725/93; 715/94; 715/95; 715/116

(58) Field of Classification Search ................... 386/96, 386/86; 725/93, 133, 94–95, 116

See application file for complete search history.

(56) References Cited

U.S. PATENT DOCUMENTS

2003/0231870 A1* 12/2003 Nagahara et al. ............... 386/96
2005/0125840 A1* 6/2005 Anderson et al. ........... 725/118

* cited by examiner

*Primary Examiner*—Hunter B. Lonsberry
(74) *Attorney, Agent, or Firm*—Thomas, Kayden, Horstemeyer & Risley

(57) ABSTRACT

Systems and methods for rearranging valid data within a block of data for transmission along a data path are described herein. By utilizing previously unused bits in data words, the valid data can be transmitted in fewer clock cycles, thereby increasing the availability of the data bus to other masters. An exemplary embodiment of a system for transmitting data along a data bus includes one or more masters, one or more slaves, and a data bus interconnecting the masters and slaves. One of the slaves is a memory controller configured to access data from an external memory device. The memory controller may be further configured to pack video data for transmission along the data bus. One of the masters is a video display controller configured to feed video data to an external video display. The video display controller may be further configured to receive the packed video data and unpack the packed video data for transmission to the video display.

24 Claims, 5 Drawing Sheets

| 31-30 | 29-24 | 23-18 | 17-12 | 11-6 | 5-0 |
|---|---|---|---|---|---|
| X | G1 | B1 | R0 | G0 | B0 |
| X | B3 | R2 | G2 | B2 | R1 |
| X | R4 | G4 | B4 | R3 | G3 |
| X | G6 | B6 | R5 | G5 | B5 |
| X | X | R7 | G7 | B7 | R6 |

| 31-24 | 23-16 | 15-8 | 7-0 |
|---|---|---|---|
| B1 | R0 | G0 | B0 |
| G2 | B2 | R1 | G1 |
| R3 | G3 | B3 | R2 |
| B5 | R4 | G4 | B4 |
| G6 | B6 | R5 | G5 |
| R7 | G7 | B7 | R6 |

US 7,752,647 B2

VIDEO DATA PACKING

CROSS-REFERENCE TO RELATED APPLICATION

This application claims the benefit of U.S. provisional application Ser. No. Ser. No: 60/807,641, filed Jul. 18, 2006, the contents of which are incorporated by reference herein.

TECHNICAL FIELD

The present disclosure generally relates to computer systems having masters and slaves sharing a data bus. More particularly, the disclosure relates to systems and methods for rearranging video data for more efficient transmission along the data bus.

BACKGROUND

FIG. 1 is a block diagram of an example of a portion of a conventional integrated circuit (IC) chip 10. The chip 10 includes a number x of masters 12 and a number y of slaves 14, interconnected by a data bus 16. The chip 10 also includes a bus arbiter 18, which receives bus arbitration requests from the masters 12 and allows one master 12 at a time to control the bus 16. When a master 12 is given control of the bus 16, this controlling master 12 may then access any slave 14 as needed.

For example, one of the slaves 14 may be a memory controller and one of the masters 12 may be a video display controller. The video display controller may request access to video data stored within a "frame buffer" in a memory device controlled by the memory controller slave 14. The video data is retrieved by the memory controller and put out onto the data bus 16 for the video display controller. The video display controller then feeds the video data to a video display.

It should be noted that a typical memory device is usually organized in data widths of 16 bits (half word) or 32 bits (word). Video data, however, is usually organized in a data width according to the width of the pixel, which may be 16 bits, 18 bits, or 24 bits wide. Each pixel of the video data typically includes the three color components red (R), green (G), and blue (B), which are the three additive primary colors of light. Typically, each color component includes six or eight bits of data to represent that color. In the case where each color component includes six bits, the pixel contains 18 bits total. In the case where each color component includes eight bits, the pixel contains 24 bits total. The 18 or 24 bits of video data for each pixel are stored in the 32-bit format of the memory device. Any unused or "don't care" bits are disregarded by the video display controller.

FIG. 2A is a chart showing the arrangement of an eight-pixel block of video data stored in a 32-bit wide memory. In this embodiment, each color component includes six bits, which totals 18 bits for each pixel. For example, bits 17-12 may be used for the red (R) component, bits 11-6 may be used for the green (G) component, and bits 5-0 may be used for the blue (B) component. Bits 31-18 are unused, or don't cares (X's), in this system. The first memory line illustrates the first pixel (pixel "0") including color components R0, G0, and B0. The second memory line illustrates the second pixel (pixel "1") including color components R1, G1, and B1, etc. Although this arrangement may be a simple way to store video data, it can be seen that a large percentage of each memory word is not used.

FIG. 2B is a chart showing the arrangement of an eight-pixel block of video data stored in a 32-bit wide memory. In this embodiment, each color component includes eight bits, which totals 24 bits for each pixel. For example, bits 23-16 may be used for the red (R) component, bits 15-8 may be used for the green (G) component, and bits 7-0 may be used for the blue (B) component. Bits 31-24 are unused bits. Although the conventional arrangements shown in FIGS. 2A and 2B represent simple ways to store video data, it can be seen that at least a quarter of the bits in each word are not used.

In addition, as is apparent from these conventional storage techniques, there are many bits that are transferred along the data bus 16 that are don't cares "X". By minimizing the number of unused bits during transmission, it may be possible to provide greater bus availability for all the bus users, thereby allowing the chip to operate more efficiently at a given speed.

SUMMARY

The present application discloses systems and methods for transmitting data along a data bus. By using packing techniques that reduce the size of a block of data, the data can be transferred in fewer clock cycles, thereby increasing the availability of the data bus for other masters sharing the data bus. After transmission of the packed data, the packed data can be unpacked to restore the data to its original format. As an example, the systems and methods discussed herein may be used for the transmission of video data, which normally includes several unused bits per word when stored in main memory.

In general, the present application describes an integrated circuit (IC) chip comprising a plurality of masters, a plurality of slaves, and a data bus interconnecting the masters and slaves. One or more of the slaves is a memory controller configured to access data from an external memory device. The memory controller is further configured to pack video data for transmission along the data bus. Also, one or more of the masters is a video display controller configured to feed video data to an external video display. The video display controller is further configured to receive from the data bus the video data packed by the memory controller and to unpack the packed video data for transmission to the video display.

For example, the memory controller may comprise a request analyzer, a buffer system configured to store data retrieved from an external memory device, and a controller device. The request analyzer may be configured to receive a data access request via a data bus and to analyze the request to determine the identity of the master making the request. The controller device may be configured to determine whether or not to pack the retrieved data and to store the data in the buffer system based on whether or not the data is packed. The controller device, for example, may comprise, among other things, control logic configured to determine whether or not the retrieved data is to be packed and a packing module configured to pack data according to a predefined packing algorithm.

In one embodiment, the video display controller may comprise a data retriever, an unpacking module, a control device, and a buffer. The unpacking module, for example, may be configured to unpack data that is identified as being packed. The control device, for example, may be configured to receive one or more signals indicating whether or not data retrieved by the data retriever is packed. The control device may further be configured to instruct the data retriever to transmit the data to the unpacking module when the data is packed and to bypass the unpacking module when the data is not packed. The buffer may store the data unpacked by the unpacking module and the data bypassing the unpacking module. Also, the buffer may then feed the data restored to its original format to a video display.

In operation, the systems may utilize a method for transmitting data along a data bus. The method, for example, may comprise determining whether a block of data retrieved from memory includes unused bits in its original form. When the block of data includes unused bits, the method may include packing valid bits into unused space of the block of data and transmitting the packed data along the data bus. The method may then include unpacking the packed data to restore the data to its original form. As a result of the methods described herein, it may be possible to pack valid bits in order to reduce the number of data words to be transmitted along the data bus.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

The present application describes systems and methods for rearranging video data to provide more efficient transmission along a data bus. For example, the systems and methods described herein may be configured within a computer system, particularly an integrated circuit (IC) chip or processor having a commonly shared data bus. By rearranging valid video data to fill previously unused space in a block of data, the video data can be packed into a tighter format to reduce the number of don't care bits. As a result, the video data can be transferred along the data bus in fewer clock cycles and the shared components of the system will not be unnecessarily stalled. Also, reducing the number of clock cycles can provide greater bus bandwidth for other bus users and can reduce the system's overall consumption of power.

In a computer processing system, the data bus, memory controller, and external memory are common resources shared by the processor and a number of masters and peripheral devices. It is therefore beneficial to optimize the utilization of these common resources by every bus user. Video data is typically stored in memory in a format that naturally does not use every bit location. It would therefore be advantageous to pack the valid data into the previously unused portions of memory in order that a block of video data can be transmitted within a fewer number of clock cycles. In this way, transmission of the video data can be performed more quickly and the data bus is not occupied as long.

Figure 3:
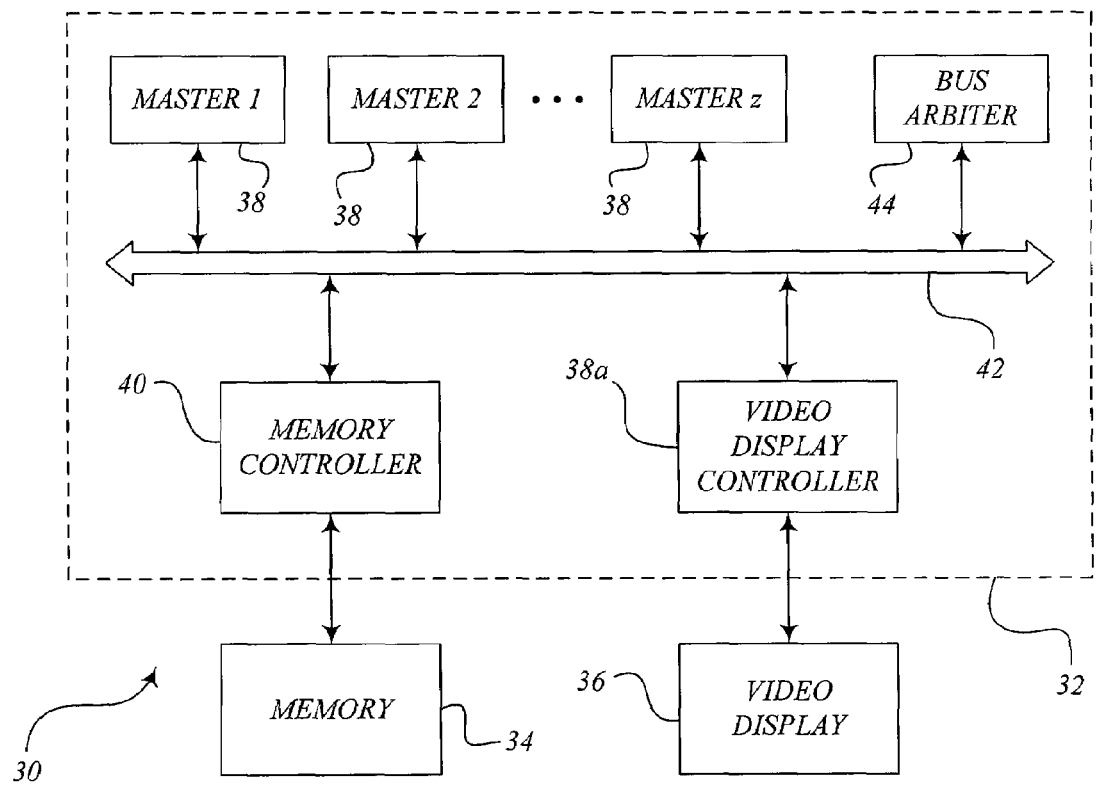
FIG. 3 is a block diagram of an embodiment of a portion of a computer system according to the teachings of the present application.

FIG. 3 is a block diagram of an embodiment of a portion of a computer system 30 according to the teachings of the present application. The computer system 30 includes, among other things, an integrated circuit (IC) chip 32, memory 34, and a video display 36. The memory 34 may include read-only memory (ROM) and/or random access memory (RAM) and preferably includes dynamic random access memory (DRAM). The memory 34 is external to the chip 32 and is accessed differently from cache memory within the chip 32. The video display 36, for example, may be a raster scan device, CRT display, LCD display, or other suitable display device.

The chip 32 includes, among other things, a plurality of masters 38, of which at least one master 38 is a video display controller 38a. The video display controller 38a is a device that may continuously provide video data to the video display 36, which then displays the video to a computer user.

The chip 32 also includes one or more slaves, only one of which is illustrated in FIG. 3, shown here as a memory controller 40. Although only one slave is illustrated in this embodiment, it should be noted that the chip 32 may include any number of slaves. The masters 38 and slaves, e.g. memory controller 40, are interconnected via a data bus 42. The chip 32 also includes a bus arbiter 44, which receives bus requests from the masters 38 and allows one master 38 at a time to control the bus 42. When a master 38 is given control of the bus 42, the controlling master 38 may then access any slave, such as the memory controller 40, as needed.

Typically, the video display controller 38a retrieves video data from memory in a common pattern and provides the video data to the video display 36 in a constant stream. Normally, video data is stored in a block of memory known as a frame buffer, which can be allocated or stored within a certain portion of the memory 34 using, for example, a unified memory architecture (UMA). When the video display controller 38a accesses data through the memory controller 40, the data can be packed into a more efficient format for transfer along the data bus 42. According to the teachings herein, the memory controller 40 is capable of packing the video data using a predefined packing algorithm before putting the video data out onto the data bus 42. The video display controller 38a is capable of unpacking the packed video data, using an algorithm that is an inverse of the packing algorithm, to restore the data to its original form. Thus, the memory controller 40 and video display controller 38a include complementary circuitry and/or logic for performing the packing and unpacking processes. Details of the memory controller 40 and video display controller 38a, along with functionality of packing and unpacking modules, are discussed below.

Figure 4:
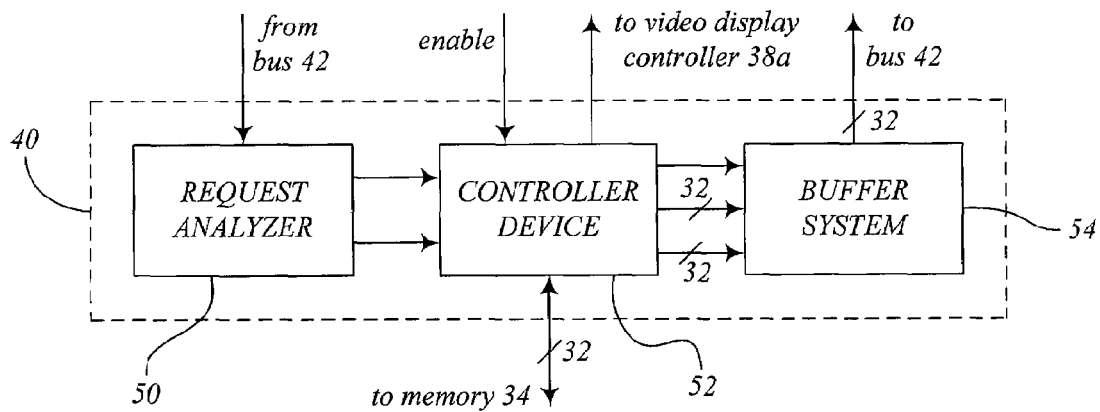
FIG. 4 is a block diagram of an embodiment of the memory controller shown in FIG. 3.

FIG. 4 is a block diagram of an embodiment of the memory controller 40 shown in FIG. 3. The memory controller 40 in this embodiment includes a request analyzer 50, a controller device 52, and a buffer system 54. In general, the memory controller 40 operates as follows. The request analyzer 50 receives a request from one of the masters 38 via the bus 42 to access data from memory 34. In response to the data access request, the request analyzer 50 processes the request signal to determine the identity of the master 38 making the request and to determine the address of the requested data in memory 34. The master's identity can be determined based on the "master number" of the request. The request analyzer 50 sends the information concerning the requesting master's identity and the requested data address to the controller device 52.

When certain conditions are met, the controller device 52 utilizes packing modules embedded therein to pack the data. The conditions, for example, include whether or not the master number corresponds to the video display controller 38a and whether or not the requested addresses correspond to video data stored in the frame buffer of the memory 34. Then the controller device 52 places the data, e.g. a 32-bit word, within the buffer system 54 based on whether or not the data was packed. If the requesting master 38 is the video display controller 38a requesting video data within a specific address range (corresponding to the frame buffer) and the controller device 52 is enabled by controlling software, then the controller device 52 packs the data and stores the packed data, e.g. 32 bits, in a special section of the buffer system 54. Otherwise, the data is not packed and is stored in general buffer space in the buffer system 54. The controller device 52 also sends a signal to the buffer system 54 indicating the appropriate time to put requested data out onto the bus 42. The details of embodiments and operations of the request analyzer 50, controller device 52, and buffer system 54 of the memory controller 40 are described below with reference to FIGS. 5-7.

Figure 5:
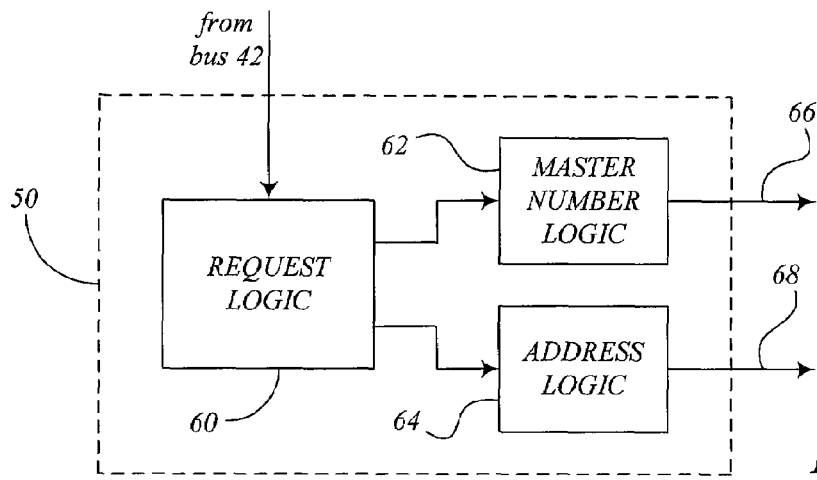
FIG. 5 is a block diagram of an embodiment of the request analyzer shown in FIG. 4.

FIG. 5 is a block diagram of an embodiment of the request analyzer 50 shown in FIG. 4. The request analyzer 50 of this embodiment includes request logic 60, master number logic 62, and address logic 64. The request logic 60 receives the data access request via the bus 42 and breaks the request down into a master number portion and an address portion. The request logic 60 sends the master number portion to the master number logic 62 and sends the address portion to the address logic 64.

The master number logic 62 processes the master number portion of the request to determine the identity of the master 38 making the request. The master number logic 62 may also store a list of masters 38 that are identified as video display controllers, such as the video display controller 38a. From this list, the master number logic 62 provides an identity signal to the controller device 52 and buffer system 54. The identity signal indicates whether or not the master is a recognized video display controller having the capacity to unpack data. The identity signal can therefore provide one of possibly several indications that the data is to be packed and stored in a separate buffer area. If the identified master is not on the list, then the master number logic 62 may instruct the controller device 52 not to pack the data and to stored the data in a general buffer of the buffer system 54, as defined below.

The address logic 64 processes the address portion of the request from the request logic 60 to determine if the address of the requested data corresponds to an address within a specific range within the memory 34. For example, the memory 34 can store video data in a specific frame buffer therein. The address logic 64 may include an address range register for keeping a list of addresses in the frame buffer. Also, the address logic 64 may keep track of the addresses currently in the buffer system 54 or, alternatively, may compare the requested address with the buffered data addresses by directly accessing this information from the buffer system 54.

Figure 6:
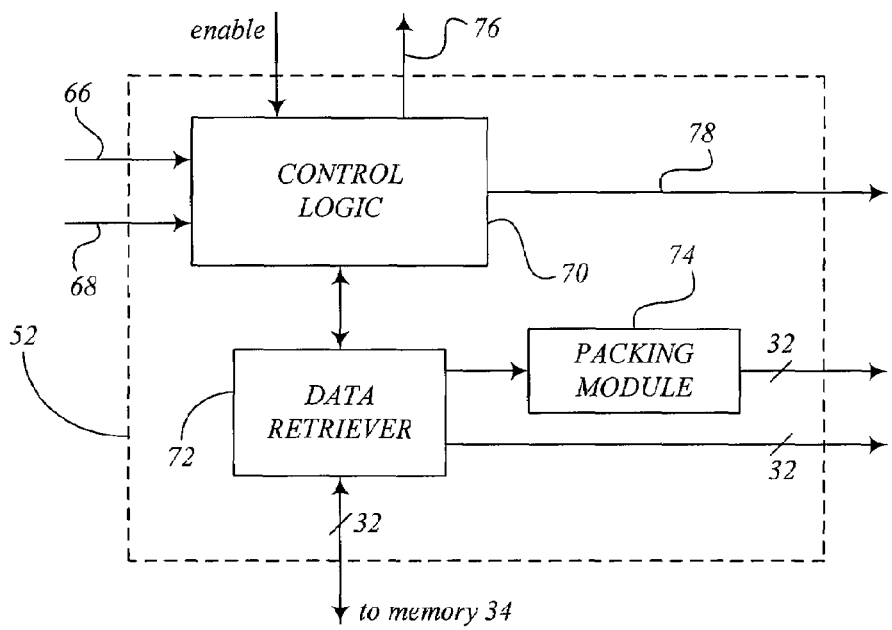
FIG. 6 is a block diagram of an embodiment of the controller device shown in FIG. 4.

FIG. 6 is a block diagram of an embodiment of the controller device 52 shown in FIG. 4. The controller device 52, according to this embodiment, includes control logic 70, a data retriever 72, and a packing module 74. The control logic 70 receives the information concerning the master number from the master number logic 62 and the requested addresses from the address logic 64 of the request analyzer 50. The control logic 70 also receives an enable signal from an external source indicating whether or not a packing process is enabled. When enabled, the control logic 70 also considers other factors before actually giving instructions to pack the data. For instance, the control logic 70 considers whether or not the identified master is a video display controller 38a having a recognized capacity to unpack data in coordination with packing algorithms used by the packing module 74. Also, the control logic 70 considers whether or not the video display controller 38a is requesting data from the frame buffer, where the data is stored in a certain pattern, e.g. the pattern described with respect to FIGS. 2A and 2B.

When the data retriever 72 retrieves the data from memory 34, the control logic 70 instructs the data retriever 72 to transmit the data, e.g. 32 bits, to the buffer system 54. If the control logic 70 determines that the data is to be packed, the control logic 70 instructs the data retriever 72 to send the data to the packing module 74 before it is stored in the buffer system 54. If any of the above-described conditions are not met, then the control logic 70 instructs the data retriever 72 to steer the data to a general buffer within the buffer system 54, thereby bypassing the packing module 74. While the requested data is transmitted to the buffer system 54 for storage, the control logic 70 provides a "packed indication signal" along line 76 to the video display controller 38a indicating whether or not the current data is packed. The packed indication signal may also indicate the algorithm used to pack the data, if more than one type of algorithm is used. The control logic 70 also sends a "transmit signal" along line 78 to the buffer system 54 indicating when the buffer system 54 is to transmit the stored data onto the bus 42.

Figure 7:
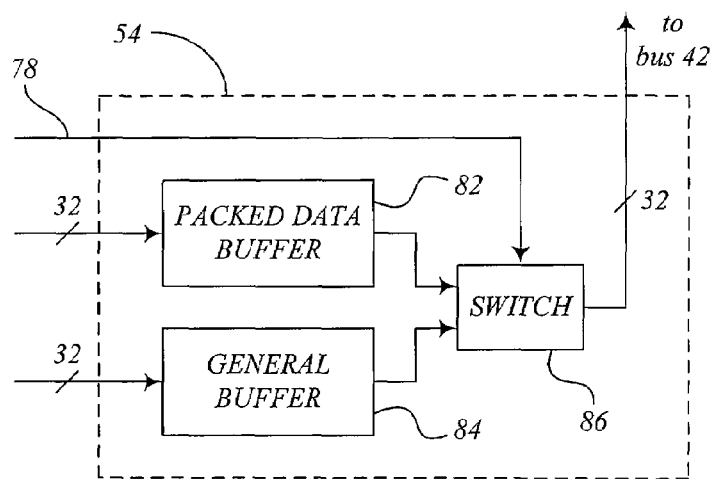
FIG. 7 is a block diagram of an embodiment of the buffer system shown in FIG. 4.

FIG. 7 is a block diagram of an embodiment of the buffer system 54 shown in FIG. 4. In this embodiment, the buffer system 54 includes a packed data buffer 82, a general buffer 84, and a switch 86. The packed data buffer 82, as the name suggests, is configured to store packed data. The general buffer 84 is configured to store other data that is not packed. The buffers 82 and 84 may be cache memory having a first-in, first-out (FIFO) configuration and are not necessarily large. For example, the size of the dedicated buffer 82 may depend on the size of the video display 36. The size may also depend on the data range going out to the video display 36, how fast data is needed, etc. As an example, the packed data buffer 82 may be configured to store 32 or 64 entries, where each entry is a 32 bit word.

The switch 86 may be configured using any suitable type or combination or configuration of electronic or logic components capable of providing the switching functions described below. The switch 86 may operate in a manner consistent with the operation of a multiplexer. The switch 86 receives the transmit signal along line 78 from the control logic 70 and, in response, puts data out onto the bus 42. The transmit signal along line 78 may also indicate from which buffer the data is to be taken. When the video display controller 38a, or other recognized video display controlling device having the capability to unpack data, requests data that is stored in the packed data buffer 82, the switch 86 allows the data stored therein to be put out onto the bus 42. However, if any other master 38 is making the request, then the switch 86 allows the data from the general buffer 84 to be put out onto the bus 42.

In addition, if the control logic 70 is not enabled to initiate the packing process, then all data will be stored in and retrieved from the general buffer 84. Or, if the video display controller 38a, or other recognized video display controlling device having the capability to unpack data, requests data from a location in memory 34 other than a recognized frame buffer, then this data will also be stored in and retrieved from the general buffer 84. Normally, the data is stored in the packed data buffer 82 when the following three conditions are met: the control logic 70 receiving the enable signal, an indication that the requesting master is the recognized video display controller, and an indication that the video display controller is requesting video data from specific addresses in memory, e.g. addresses corresponding to the frame buffer.

The packed data buffer 82 is dedicated for use primarily by one master that requests video data from the frame buffer. The general buffer 84 is used by the masters other than the one dedicated master. The buffers are in parallel with each other and can store a nominal amount of data handled by a typical memory controller. By placing the buffers in parallel, if another master 38 gains control of the data bus 42 while the video data is stored in the packed data buffer 82, the stored data can still be retrieved when the video display controller 38a again gains control of the bus 42, without missing the packed video data.

As an alternative embodiment, the controller device 52 may be altered such that the data retriever 72 may be configured to transmit data via one of a plurality of paths through multiple packing modules. In this respect, additional paths leading from the data retriever 72 may be designed in the system. With multiple packing modules 74, different packing algorithms may be selected, depending on the number of bits per pixel, storage format, or other parameters or conditions. In this way, the control logic 70 may be able to select one packing module for packing the requested video data according to desired packing results. With regard to this alternative embodiment, the buffer system 54 may also be altered to include additional parallel paths including multiple packed data buffers 82. By utilizing this alternative embodiment, it may be possible to allow a plurality of video display controllers to receive packed data. Pre-selected correlation information may be stored in the controller device 52 for correlating a certain one of multiple video display controllers with a corresponding packing module and packed data buffer. The transmit signal from the control logic 70 along line 78 may also be used in this example to indicate from which packed data buffer the data is to be taken.

Alternatively, the packed data buffer 82 (or buffers, if multiple buffer are used) and the general buffer 84 may be configured as a single cumulative buffer having portions allocated in any desirable manner. In this respect, certain percentages of the cumulative buffer may be allocated for specific masters, depending on data size requirement or other parameters. Any portions of the buffer not specifically allocated to a particular master can be available as general storage for the remaining masters. Also, in this regard, instead of including the switch 86, the buffer system 54 may be configured such that portions of the cumulative buffer may alternatively be accessed using any suitable accessing means.

The memory controller 40 of the present disclosure can be implemented in hardware, software, firmware, or a combination thereof. In the disclosed embodiments, any of the request logic 60, master number logic 62, address logic 64, control logic 70, and packing module 74 may be implemented, at least in part, in software or firmware that is stored in memory and that is executed by a suitable instruction execution system. Alternatively, this logic can be implemented in hardware with any combination of suitable components, such as discrete logical circuitry having gates for implementing logic functions, an application specific integrated circuit (ASIC), etc.

The method of operation of the memory controller 40 may include any suitable architecture, functionality, and/or operation of various implementations of processing software. In this regard, each function may be a module, segment, or portion of code, which comprises one or more executable instructions for implementing the specified logical functions. It should also be noted that in some alternative implementations, the functions may occur out of the specified order or executed substantially concurrently.

Figures 1, 2A, 2B:
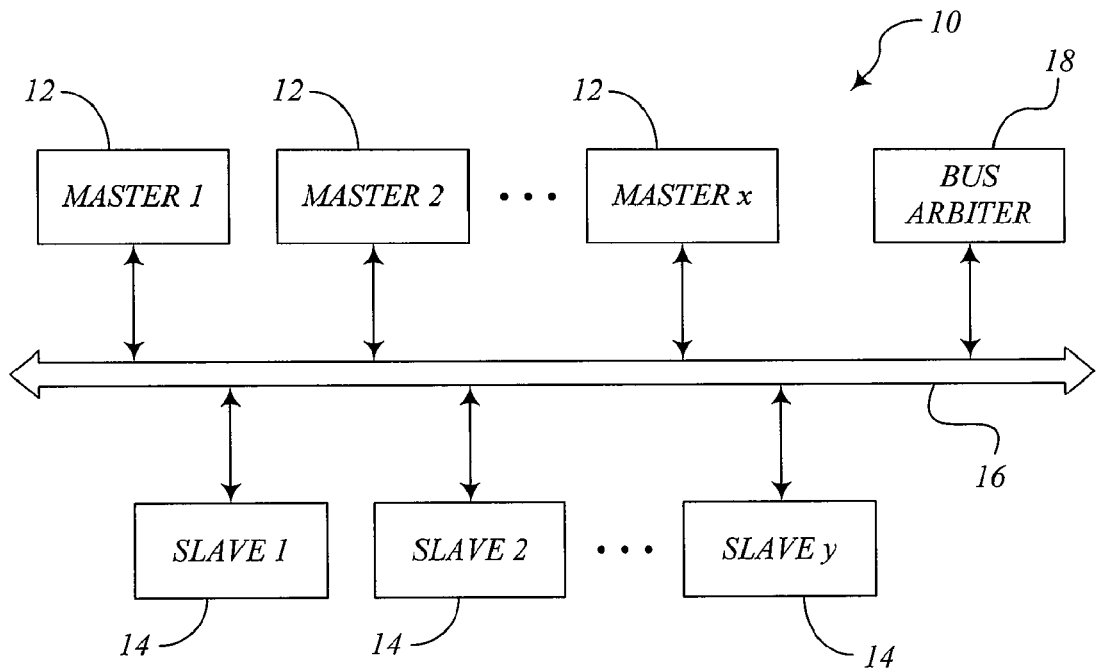
FIG. 1 is a block diagram illustrating a conventional master/slave configuration of an integrated circuit chip.
FIGS. 2A and 2B are charts showing the conventional arrangement of pixel data within blocks of video data.
Figures 8A, 8B, 9:
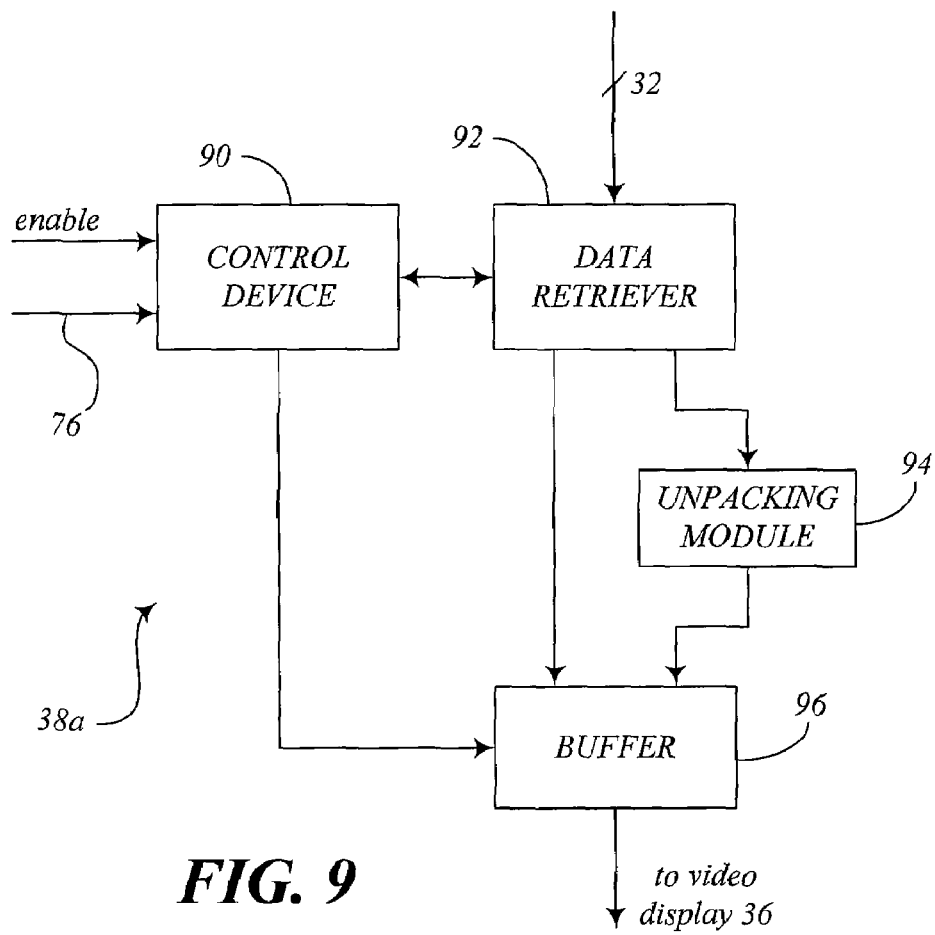
FIGS. 8A and 8B are charts illustrating examples of possible packing techniques for packing video data within previously unused space of data words in memory.
FIG. 9 is a block diagram of an embodiment of the video display controller shown in FIG. 3.

FIGS. 8A and 8B are charts showing examples of possible arrangements of video data packed according to different packing algorithms of the packing module(s) 74. Instead of allowing the video data to remain in the original format as shown in FIGS. 2A and 2B, the memory controller 40 rearranges the video data to utilize more of the unused space. In these arrangements, the video data can be transferred along the data bus 42 more efficiently. It should also be noted that with an eight-pixel block of video data, some color components may be separated from the other color components of the pixel and placed in separate words. In this case, the separated components are transmitted during different clock cycles.

FIG. 8A illustrates a packing scheme when each color component includes six bits, where, in this type of system, the total number of bits per pixel is 18. In the prior art, 14 of the 32 bits would be unused, as mentioned above. However, in this example, B1 and G1 for the second pixel (pixel 1) are packed or placed in bit locations 23-18 and 29-24, respectively, and transmitted with pixel 0 having components R0, G0, and B0. The remaining color component of pixel 1, i.e. R1, is packed in the second line and the following pixels are packed in as shown. In this case, only bit locations 31 and 30 are not used and the color components are left intact. To achieve even greater packing efficiency, an alternative packing algorithm may be used to utilize every bit location, including bits 31 and 30. In this case, however, the color components will be divided and the algorithm may include greater complexity. This example shows only eight pixels being packed at once. However, depending on the size of the packed data buffer 82 and the size of requested blocks of data, a different number of pixels can be packed together. With eight pixels packed as shown, the efficiency of transmission of this video data is increased, wherein eight pixels that are normally transmitted in eight request cycles in the prior art can be transmitted in only five cycles by using the embodiments according to the present application.

FIG. 8B illustrates another packing scheme that may be used for packing when each color component is eight bits, or 24 bits total for each pixel. In this case, it can be seen that one color component from another pixel can be packed or placed in the previously unused bit positions 31-24. According to this packing scheme, there are no unused bits. The efficiency of transmission of this packed data scheme also increases, in which the previously inefficient eight lines can be packed into only six lines as shown for a 25% reduction in transfer time.

FIG. 9 is a block diagram of an embodiment of the video display controller 38a shown in FIG. 3. This embodiment, and other suitable embodiments that may be conceived from an understanding of the present application, are meant to be used in cooperation with a packing device that packs data according to a predefined packing algorithm, such as the memory controller 40 described herein. In this embodiment, the video display controller 38a includes a control device 90, a data retriever 92, an unpacking module 94, and a buffer 96. The components of the video display controller 38a may operate in a similar manner as the related components in the memory controller 40.

The control device 90 receives an enable signal from the external software that also provides a similar enable signal to the control logic 70. Alternatively, an enable signal may be generated automatically based on a bit-per-pixel setting in the video display controller 38a. When enabled, the control device 90 may utilize unpacking processes as necessary and if other conditions are met. The control device 90 also receives the packed indication signal along line 76 from the control logic 70 indicating that the current video data, either on the data bus 42 or being transferred to the data bus 42, has been packed. The control device 90 may alternatively be responsive to other signals if other conditions dictate. For example, the control device 90 may receive the master number information and address information directly from the request analyzer 50 if available.

The control device 90 instructs the data retriever 92 to read data from the data bus 42 in a burst having a length equal to the size of the block of data on the data bus 42. If the data is packed, the burst length may be five or six beats, depending on the algorithm used to pack the video data. The control device 90 also instructs the data retriever 92 whether to send the data to the unpacking module 94 or to bypass the unpacking module 94. If the data is sent to the unpacking module 94, the unpacking module 94 unpacks the data using an algorithm that restores the data into its original form, such as in the form shown in FIGS. 2A and 2B. In this way, the external video display 36 may receive the video data according to conventional formats and itself does not require re-design. The unpacked data is then stored in the buffer 96. If the data is not unpacked, the data bypasses the unpacking module 94 and is stored in the buffer 96. At this point, the data stored in the buffer 96 is in a normal format recognized by a typical video display 36. The control device 90 controls the buffer 96 to feed the data to the video display 36 for display.

In the alternative embodiment described above in which a plurality of packing modules 78 are utilized for the purpose of packing according to different packing algorithms, the video display controller 38a may also be altered to include multiple parallel branches of unpacking modules 94. In this way, the control device 90 may instruct the data retriever 92 to steer the data to the appropriate unpacking module 94 in accordance with the type of packing algorithm utilized.

The video display 36 sees the video data the way it is originally stored in memory 34. However, during transfer of this video data from the memory controller 40 to the video display controller 38a via the data bus 42, the format of the video data is changed. The memory controller 40 rearranges the video data by packing the valid portions of the data into unused space to reduce the size of the block of video data. No valid data is lost in the packing process. Then, the burst of packed video data along the data bus 42 can be performed in fewer cycles. The video display controller 38a then converts the packed video data back into its original form using an unpacking algorithm that is the inverse of the memory controller's packing algorithm.

Figure 10:
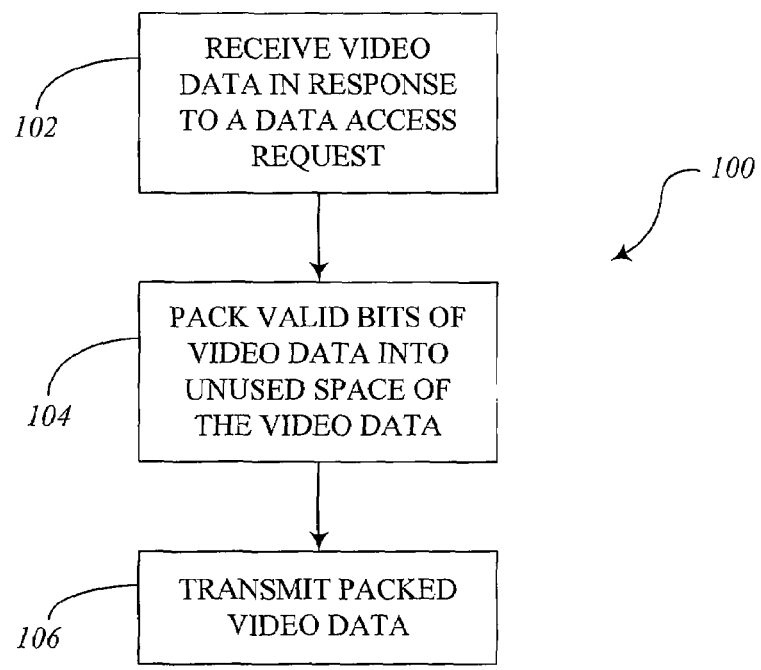
FIG. 10 is a flow chart illustrating an embodiment of a packing method 100 according to the present disclosure.

FIG. 10 is a flow chart illustrating an embodiment of a packing method 100 according to the present disclosure. The packing method 100 includes receiving video data in response to a data access request, as shown in block 102. In block 104, valid bits of the video data are packed into unused space of the video data. For example, the unused space of the video data may be associated with data having no content or no valid content. In addition, packing the valid bits may include determining if there is unused space in the video data. Also, packing the valid bits may include determining if the data access request is sent by a predetermined video display controller. For example, a predetermined video display controller may correspond to a controller having the ability to unpack the video data. Furthermore, the step of packing valid bits into unused space, as described in block 104, may also include dividing the video data into units and components. In this respect, the valid bits of a component of one unit can be placed into unused space of a component of another unit. After packing the valid bits, the packed video data is transmitted to a bus interface, as shown in block 106.

Figure 11:
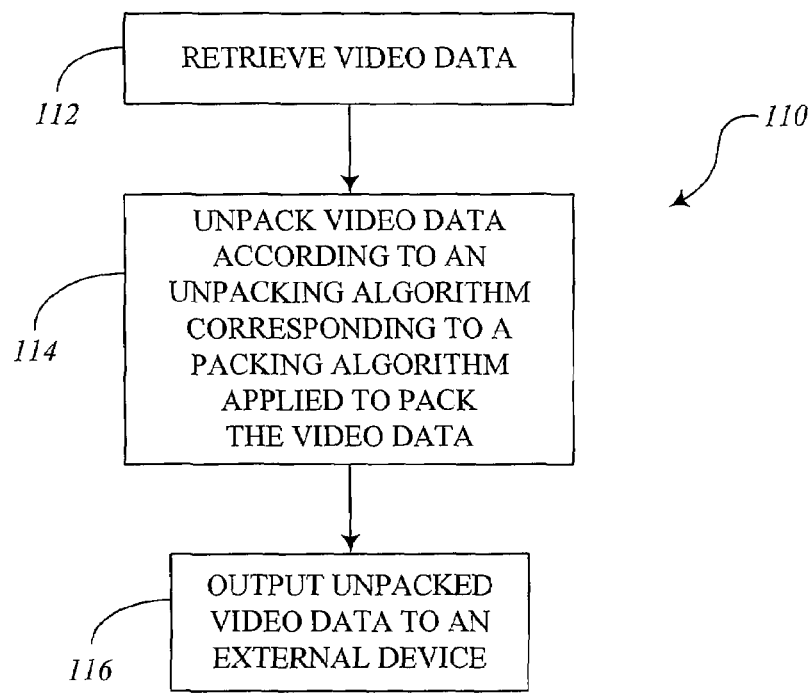
FIG. 11 is a flow chart illustrating an embodiment of an unpacking method 110 according to the present disclosure.

FIG. 11 is a flow chart illustrating an embodiment of an unpacking method 110 according to the present disclosure. In block 112, video data is retrieved from a bus. In block 114, packed video data is unpacked according to an unpacking algorithm corresponding to a packing algorithm applied to pack the video data. For example, the unpacking algorithm may be an inverse of the packing algorithm and may be used to restore the video data to its original pre-packed form. In block 116, the unpacking method 110 further comprises outputting the unpacked video data to an external device, such as, for example, a video display device.

It should be emphasized that the above-described embodiments are merely examples of possible implementations. Many variations and modifications may be made to the above-described embodiments without departing from the concepts, principles, and teachings of the present disclosure. All such modifications and variations are intended to be included herein within the scope of this disclosure and protected by the following claims.

I claim:

1. A system for transmitting video data, comprising:
a memory controller configured to receive a data access request and to pack video data accessed from an external memory device for transmission along a data bus according to a packing algorithm corresponding to at least one parameter of the data access request, wherein the packing algorithm comprises rearranging valid bits of the video data to unused space within the video data; and
a video display controller configured to send the data access request for requesting the video data in the external memory device, to unpack the packed video data from the memory controller according to an unpacking algorithm corresponding to the packing algorithm, and to feed the unpacked video data to an external video display.

2. The system of claim 1, wherein the memory controller further comprises:
a request analyzer configured to receive the data access request and to analyze the at least one parameter of the data access request;
a controller device configured to receive the at least one parameter and to pack the video data according to the packing algorithm determined by the parameter; and
a buffer system configured to store the packed video data from the controller device and to transmit the packed video data to the video display controller along the data bus.

3. The system of claim 2, wherein the controller device is further configured to pack the video data in response to receiving an enable signal.

4. The system of claim 2, wherein the request analyzer further comprises:

a request receiving module configured to receive the data access request and to extract identification information and address information of the data access request;

an identification module configured to process the identification information and to determine the identity of a device sending the data access request; and an address module configured to process the address information and to determine the video display controller sending the data access request.

5. The system of claim 2, wherein the buffer system further comprising a packed data buffer configured to store the packed video data and a general buffer configured to store the video data which is not packed.

6. The system of claim 1, wherein the video display controller further comprises:

a data retriever configured to retrieve the packed data from the memory controller along the data bus;

an unpacked module configured to unpack the packed video data according to the unpacking algorithm;

a buffer configured to store the unpacked video data and to feed the unpacked video data to the external video display.

7. The system of claim 6, wherein the video display controller is further configured to unpack the packed video data retrieved from the memory controller in response of an enable signal.

8. The system of claim 1, wherein the unpacking algorithm of the video display controller is inverse to the packing algorithm of the memory controller.

9. The system of claim 1, wherein the memory controller and the video display controller are disposed in the same integrated circuit chip.

10. A method comprising:

receiving video data from an external memory device in response to a data access request;

selecting a packing algorithm according to at least one parameter of the data access request;

packing valid bits of the video data into unused space of the video data based on the selected packing algorithm; and transmitting the packed video data along a data bus;

wherein the unused space of the video data includes no content.

11. The method of claim 10, wherein the step of packing the valid bits into the unused space of the video data further comprises:

determining whether the video data includes unused space.

12. The method of claim 11, wherein the valid bits of the video data are not packed if the video data includes no unused space.

13. The method of claim 10, wherein the step of packing the valid bits into the unused space of the video data is enabled by receiving an enable signal.

14. The method of claim 10, wherein the step of packing the valid bits into the unused space of the video data further comprises:

determining whether the data access request is sent by a predetermined video display controller having the capability to unpack the video data.

15. The method of claim 14, wherein the step of determining whether the data access request is sent by the predetermined video display controller further comprises determining identification information and address information of the video display controller sending the data access request.

16. The method of claim 10, wherein packing the valid bits into the unused space of the video data further comprises:

dividing the video data into a plurality of units having a plurality of components;

placing at least a first component having valid bits of a first unit into at least a second component, which includes unused space of a second unit.

17. The method of claim 16, wherein the unit of the video data represent video data of one pixel and the components having valid bits of the video data represent color components of video data.

18. A method for unpacking video data transmitted along a data bus, comprising the steps of:

retrieving the video data along the data bus;

unpacking the video data according to an unpacking algorithm corresponding to a selected packing algorithm applied to pack the video data before being retrieved, wherein the packing algorithm was selected from among multiple packing algorithms; and outputting the unpacked video data to an external device.

19. The method of claim 18, further comprising:

sending a data access request for requesting the video data.

20. The method of claim 19, wherein the data access request comprises a combination selected from a group of identification information and address information.

21. The method of claim 20, wherein the packing algorithm is determined by the combination.

22. The method of claim 18, wherein the unpacking algorithm is inverse to the packing algorithm.

23. The method of claim 18, wherein the step of unpacking the video data is responsive to receiving an enable signal.

24. The system of claim 1, wherein the at least one parameter comprises one or more of:

a number of bits per pixel; and storage format.

* * * * *